A. A. LONG.
TIRE ADJUSTER.
APPLICATION FILED MAY 14, 1906.
927,254.
Patented July 6, 1909.
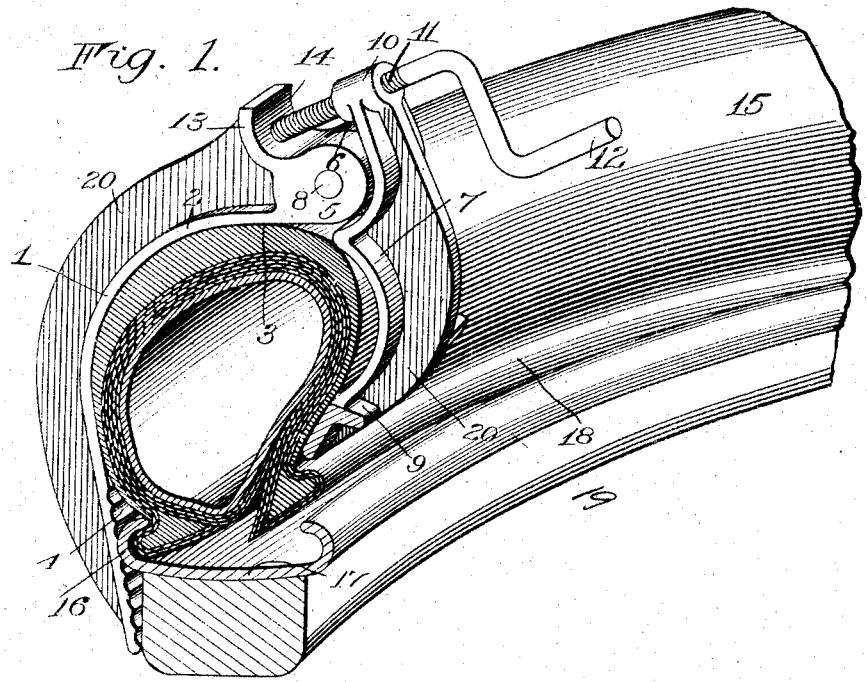
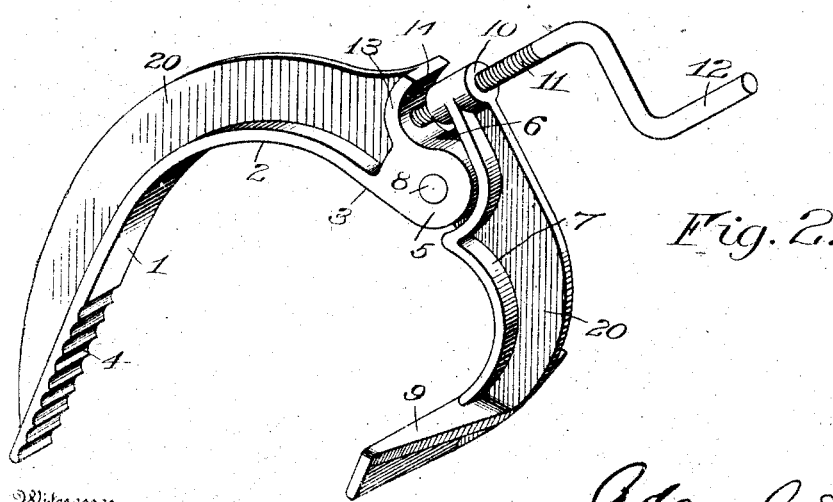
Witnesses
Walter B. Payne
Russell B. Griffith
Inventor
Adam A. Long
By
Attorneys

UNITED STATES PATENT OFFICE.

ADAM A. LONG, OF ROCHESTER, NEW YORK, ASSIGNOR TO LONG & MANN COMPANY, OF ROCHESTER, NEW YORK, A CORPORATION OF NEW YORK.

TIRE-ADJUSTER.

No. 927,254.  Specification of Letters Patent.  Patented July 6, 1909.

Application filed May 14, 1906. Serial No. 316,616.

*To all whom it may concern:*

Be it known that I, ADAM A. LONG, of Rochester, in the county of Monroe and State of New York, have invented certain new and useful Improvements in Tire-Adjusters; and I do hereby declare the following to be a full, clear, and exact description of the same, reference being had to the accompanying drawings, forming a part of the specification, and to the reference-numerals marked thereon.

My present invention relates to devices for applying and removing the tires to vehicles wheels, and it has for its object to provide a device of this nature particularly applicable for use upon heavy pneumatic rubber tires, which device may be conveniently operated with small effort to force the edge of the tire upon the rim, or disengage it therefrom, and which while light and of small proportions will yet be capable of exerting the requisite power and be applicable to tires of different sizes without the necessity of adjustment.

My improvements are further directed toward economy of parts and of the materials from which they are made.

To these and other ends the invention consists in certain improvements and combinations of parts all as will be hereinafter more fully described, the novel features being pointed out in the claims at the end of the specification.

In the drawings: Figure 1 is a perspective of a device embodying my invention as used in the adjusting of a pneumatic clencher tire, and Fig. 2 is a similar view of the device detached with the jaws in open position.

Similar reference numerals in the several figures indicate similar parts.

My device is particularly well fitted for use in the application or removal of pneumatic tires of the type known as clencher tires such as are used upon motor vehicles, in which connection it is illustrated, although it will be understood that the device is also adapted for use with those tires in which the shoes or covers are secured by a removable ring forming part of the wheel rim. The instrument consists generally of two hinged members adapted when in use to straddle the tire when one edge or bead, preferably the one at the inner side of the tire, has been applied to the rim, the inner member or jaw being braced against the corresponding edge of the rim while the outer jaw is moved inwardly relatively thereto by means of suitable power devices in such a manner that it will engage the tire on the outer side and contract the same so as to draw the free edge or outer bead to its proper position on the wheel, or separate it therefrom when used during the removal of the tire.

As illustrated in the accompanying drawings 1 indicates the larger, or what may be termed the supporting jaw, the inner end of which is curved to an approximately semicircular form as at 2, whereby it conforms to the periphery of the tire over which it is adapted to be placed in use, while the outer end 3 is substantially straight and provided near its extremity with teeth or serrations 4 forming projections by means of which it grips the inner edge of the rim or support and is prevented from slipping thereon. These serrations extend for some distance along the jaw to permit the device to be used upon tires of different sizes, as will be understood. The inner end of the supporting jaw is provided with an extension 5 coöperating with a similar extension 6 on the smaller jaw 7 by means of which the two jaws are pivotally connected by the pin 8 passing through the said projections and forming a hinge. The jaw 7 is also curved and the outer end extended laterally on both sides to form a heel 9 for engagement with the free edge of the tire on the outer side thereof. The inner end extends beyond the pivotal center and terminates in a threaded lug 10 in which operates a screw 11, rotated by means of a crank-handle 12. Opposite thereto upon the jaw 1 is an upward extension 13 having a smooth curved or cam surface 14 adjacent the end of the screw 11 and upon which the latter rides when rotated in the proper direction to force the outer ends of the jaws together. The cam is made involute in respect to the pivot or, in other words, so formed that as these inner ends of the jaws are forced apart to different relative positions, the screw will nevertheless be at all times perpendicular to its surface, and hence have a firm, longitudinal bearing thereon to obviate any tendency to force its end sidewise to bend or break it.

My device is of service chiefly in forcing the outer bead of a clencher tire to its place on the flange of the rim or from disengagement therewith preliminary to the removal of the tire; the insertion of an inner tube within the shoe or casing, wherein it is necessary to remove the outer bead only, forming occasion for its use. The instrument is straddled upon the tire, indicated by numeral 15 in Fig. 1 of the drawings, with the serrated end of the jaw 1 held in contact with the inner flange 16 of the rim 17 while the heel 9 of the jaw 7 bears upon the outer side of the tire just above the bead 18. By reason of the fact that the jaw 7 is the shorter of the two while the other is of such a length as to bring the pivot well over the center or tread of the tire, the operation of the screw forces the heel 9 both inwardly and upwardly crimping the casing in such a manner as will raise the bead 18 sufficiently to clear the flange 19 before it is forced into place or removed. The operation must, of course, be repeated at intervals along the circumference, or several clamps may be used at the same time.

A light though powerful device may be inexpensively constructed in accordance with my invention from cast parts though the inner faces of the jaws should be of sufficient breadth to prevent possible injury to the tire, and preferably strengthened by reinforcing ribs 20.

While my present construction is cheap and practical, other devices might be employed for operating the jaws without departing from the spirit of my invention.

I claim as my invention:

1. A device for adjusting the tires of vehicle wheels comprising a pair of pivotally connected jaws, one of which is longer than the other and is provided with a curved tire-engaging portion conforming substantially to a transverse profile of one side of a pneumatic tire, and an elongated straight rim-engaging portion proceeding from the outer end of the curved portion to coöperate with a wheel rim to which the tire is secured, and the other of said jaws carrying a smooth tire-engaging-heel to operate on the opposite side of a tire between the ends of the curved portion of the longer jaw and being curved above the heel.

2. A device for adjusting tires of vehicle wheels comprising a pair of pivotally connected jaws, one of which is longer than the other and has a smooth and curved tire-engaging face conforming substantially to a transverse profile of one side of a pneumatic tire and an elongated corrugated rim-engaging portion beyond the curved face to coöperate with a wheel rim to which the tire is secured, and the other of said jaws carrying a smooth tire-engaging-heel to operate on the opposite side of a tire between the ends of the curved face of the longer jaw.

3. In a device for adjusting the tires of vehicle wheels, the combination with a curved jaw adapted to extend over a tire transversely thereof and an opposed jaw pivoted thereto, each of said jaws being provided with a projection on the same side of the pivotal center, and one of said projections being provided with a cam surface of substantially involute curvature, of an operating member embodying a screw threaded into the other projection and engaging the cam to effect a relative movement of the jaws when rotated.

ADAM A. LONG.

Witnesses:
RUSSELL B. GRIFFITH,
WALTER B. PAYNE.